US006360437B1

(12) United States Patent
Fukumoto et al.

(10) Patent No.: US 6,360,437 B1
(45) Date of Patent: Mar. 26, 2002

(54) ELECTRICAL CONTACT HAVING SURFACE COATING LAYER WITH IRREGULAR SURFACE DUE TO HARD PARTICLES DISPERSED IN THE SURFACE COATING LAYER

(75) Inventors: Tadashi Fukumoto, Oume; Shigenori Itoh, Hachioji, both of (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 09/527,056

(22) Filed: Mar. 15, 2000

(51) Int. Cl.7 ................................................ A01R 43/16

(52) U.S. Cl. ............................. 29/874; 29/825; 29/878; 427/123; 428/605; 428/608

(58) Field of Search .......................... 29/825, 884, 874, 29/878; 428/605, 608; 427/123

(56) References Cited

U.S. PATENT DOCUMENTS 4,447,109 A * 5/1984 Hobart, Jr.
4,650,723 A * 3/1987 Furuya
4,662,702 A * 5/1987 Furuya
4,865,933 A * 9/1989 Blanyer et al.
5,032,421 A * 7/1991 Sarma et al.
5,351,396 A * 10/1994 Sawada et al.

* cited by examiner

*Primary Examiner*—Carl J. Arbes
(74) *Attorney, Agent, or Firm*—Michael Best & Friedrich LLC

(57) ABSTRACT

In an electrical contact having a contacting portion to be brought into contact with and electrically connected with a terminal member, the contact comprises a metallic body having a body surface and a metallic plated layer formed on the body surface of at least the contacting portion. The metallic plated layer has hard conductive particles dispersed in the layer in order to enable to remove contamination from a surface of the terminal member when the contacting surface is brought into contact with the terminal member. The surface layer has an irregular surface due to presence of the hard conductive particles dispersed therein. When the contacting portion is brought into contact with the terminal member, the contamination is removed by irregular surface.

13 Claims, 5 Drawing Sheets

ELECTRICAL CONTACT HAVING SURFACE COATING LAYER WITH IRREGULAR SURFACE DUE TO HARD PARTICLES DISPERSED IN THE SURFACE COATING LAYER

BACKGROUND OF THE INVENTION

This invention relates to an electroconductive or electrical contact (which will simply be referred to as "contact") to be brought into contact with an electrical terminal member such as terminal plate, flat lead, ball contact or another electrical contact for establishing electrical connector therebetween, and in particular, to a surface structure of a contacting portion of such a contact and a method for producing the contact.

in order to establish a removable electrical connection between two electrical units, it is known in the prior art that one of them has contacts which are brought into contact with corresponding terminal members of the other unit, respectively. Typically, one unit is an electrical connector and the other unit is a circuit component part, a printed circuit board, an IC package or other electrical units.

It is also known in the prior art that the electrical connection between the contact of one unit and the terminal member of the other unit is often made insufficient due to presence of oxide or any contaminant attached to the surfaces of the contact and the terminal member. In order to achieve reliable electrical connection, such oxide or contaminant must be removed to expose metal surfaces of the contact and the terminal member when they are brought into contact with each other.

in order to remove the oxide or contaminant, it is known in the art to apply contacting pressure on the order of 1N (newton) per contact to crush the oxide or the contaminant. If one unit is an electrical connector having 100 contacts, the contacting pressure is required the order of 100N in total. Such a large contacting pressure undesirably makes it difficult to establish an electrical connection between the two units.

For example, when a liquid crystal display (hereinafter abbreviated to LCD) panel is connected to a connector, that is a so called LCD connector, mounted on a printed circuit board, an indium tin oxide (hereinafter abbreviated to ITO) film as a transparent conductive electrode is used between the LCD panel and the LCD connector. When the ITO film are applied with high contacting pressure from the contact, it may result in a damage or a breakage.

in another example where the unit connected to the connector is a unit having a ball grid array (BGA) as the terminal members, for example, a semiconductor BGA package such as an LSI package or an IC package, the balls made of solder in the BGA may be undesiredly broken or released under the high contacting pressure. In this event, troublesome repair work is required.

Another known approach for removing the oxide and/or contamination is to relatively slide the both units to be connected to thereby wipe off the oxide and/or contamination. However, considering miniaturization of electronic devices, it becomes difficult to relatively slide the units to be connected to each other in the small-size device.

SUMMARY OF THE INVENTION

It is an object of this invention to provide an electrical contact which assures reliable connection with a terminal member under a low contacting pressure without interference of oxide and/or contamination adhered thereto.

It is another object of this invention to provide a method of forming the above-mentioned contact.

This invention provides an electrical contact having a contacting portion to be brought into contact with and electrically connected with a terminal member which comprises a conductive body having a body surface, a conductive surface coating layer formed on the body surface of at least the contacting portion, and hard conductive particles dispersed in the surface coating layer. The surface coating layer has an irregular surface due to presence of the hard conductive particles dispersed therein.

A particle size of the hard conductive particles must be selected so that the conductive surface coating layer has an irregular surface due to presence of the hard conducive particles dispersed or embedded in the conductive surface coating layer. When the particle size is excessively small in comparison with a thickness of the conductive surface coating layer, the conductive surface coating layer results to have the irregular surface. When the particle size is excessively large in comparison with a thickness of the conductive surface coating layer, the conductive surface coating layer cannot firmly retain the hard conductive particles therein. The hard conductive particles preferably have an average particle size around the thickness size of the conductive surface coating layer. Typically, the particle size is about 0.3–2, preferably, 0.5–1.5 times of the thickness size of the conductive surface coating layer.

The surface coating layer is typically a plated metal layer having the hard conductive particles.

The plated metal layer may comprise a first plated sub-layer containing conductive hard particles dispersed therein and formed on the body surface, and a second plated sub-layer formed on the first plated sub-layer.

The first plated sub-layer may comprise a primary plated sub-layer made of a first metal and containing the conductive hard particles dispersed therein, and a secondary plated sub-layer made of the first metal and formed on the primary plated sub-layer. The second plated sub-layer is made of a second metal different from the first metal and formed on the secondary plated sub-layer.

The conductive body is made of elastic metal such as phosphor bronze, or other Cu-base alloy.

The first metal is one selected form a group of Ni, Cu, and Sn.

The second metal is one selected from a group of Au, Au-alloy, Pd. Pd—Ni alloy, Sn and Sn—Pb alloy.

The hard conductive particles are particles made of one or more selected from a group of TiN, WC, Ni, $TiO_2$ and $Cr_2O_3$.

The contact can be produced by the following method.

A blank is prepared by blanking or stamping a sheet of conductive elastic plate. The blank comprises a carrier frame and a plurality of contact blanks extending from the carrier frame to their extending free ends in parallel with each other. While, an electroplating bath is prepared which contains a composite plating solution comprising an electroplating solution of a first metal acid and hard conductive particles suspended therein. The blank is supported in the electroplating bath by holding the carrier above the composite plating solution so that the contact blanks are at least partially dipped in the composite plating solution, and then subjected to an electroplating process. By the electroplating process, a first plated layer of the first metal is formed on a surface of a portion of each of the contact blanks dipped in the composite plating solution and, simultaneously, the hard conductive particles are deposited on the surface due to electro-deposition so that the hard conductive particles are dispersed in the first plated layer. The first plated layer has an outer surface with irregularity due to presence of the hard conductive particles dispersed therein. Then, each of the contact blanks is separated or cut from the carrier frame to provide the contact.

Before and/or after being cut, each of the contact blanks can be formed in a desired shape by bending and/or curving process.

Before cutting each of contact blanks from the carrier frame, the blank can be subjected to second and/or third plating process to form second and/or third plated layer on the first plated layer. The second plated layer is of the first metal and is directly formed on the first plated layer by use of a second electroplating bath containing the electroplating solution of the first metal acid without the hard conductive particles. Alternatively, the third plated layer is of a second metal add different from the first metal and is directly formed on the first plated layer by use of a third electroplating bath containing the electroplating solution of the third metal acid without the hard conductive particles. When the both of the second and third plated layers are formed, the third plated layer is directly formed on the second plated layer.

This invention further provides an electrical connector having a plurality of contacts for establishing electrical connection between two electric objects each having a plurality of terminal members. Each of the contacts is the contact according to this invention as described above and has two contacting portions at opposite ends thereof so as to be brought into contact with terminal members of the two electric objects.

DESCRIPTION OF THE PREFERRED EMBODIMENTS

Figure 1:
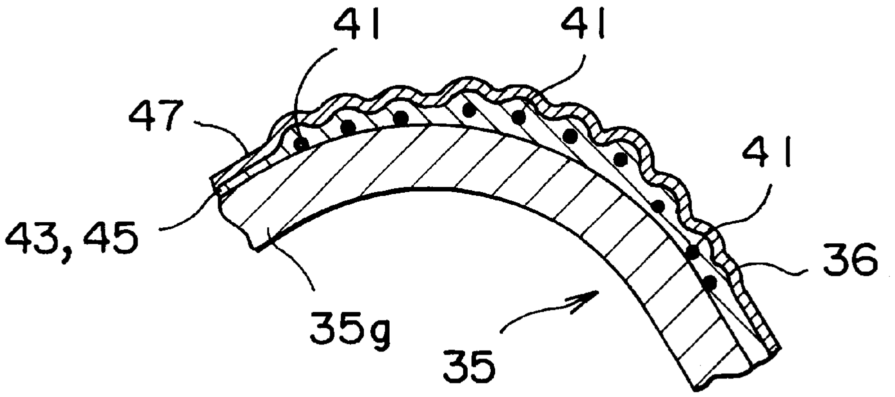
FIG. 1 is a sectional view showing a part of a contacting portion of a contact according to this invention.
Figure 2:
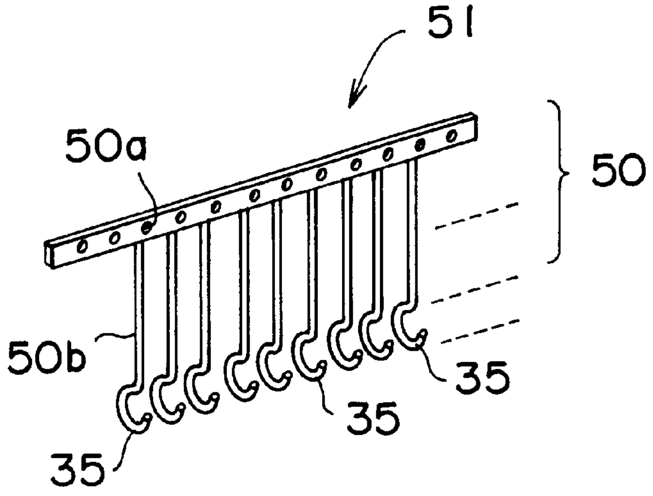
FIG. 2 is a perspective view showing a metal blank comprising a carrier frame and strips, each being for the contact of FIG. 1, extending from the carrier frame.
Figure 3:
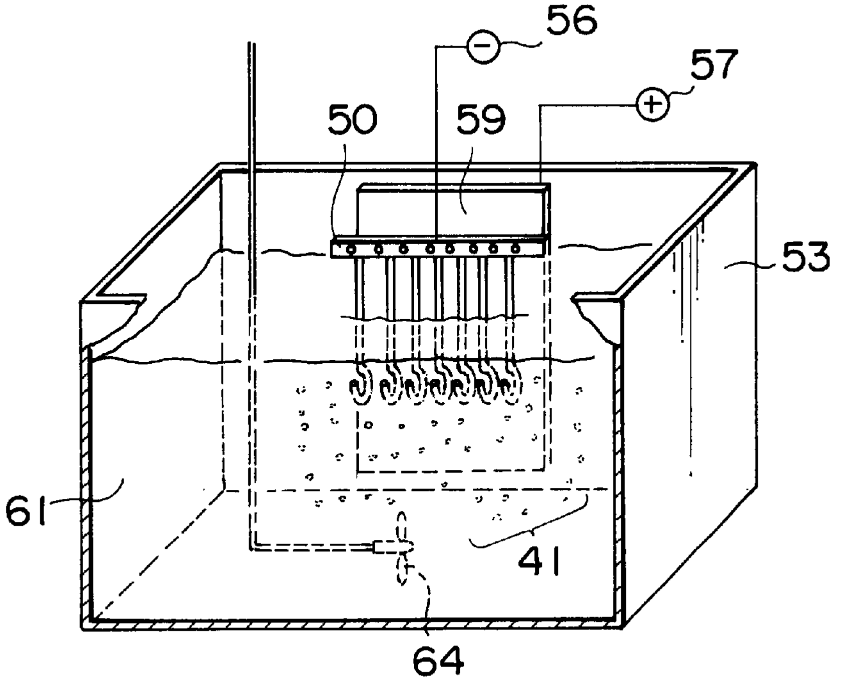
FIG. 3 is a perspective view of an electroplating bath with the blank of FIG. 2 being subjected to an electroplating process.

Referring to FIGS. 1 through 3, description will be made below as to a contact 35 according to an embodiment of this present invention and a producing method of the contact.

As illustrated in FIG. 1, the contact 35 is in a form of an elastic metal plate body such as phosphor bronze, or other Cu-base alloy and has a contacting portion 35*g* which is brought into contact with a terminal member of an electric device or part. The contact 35 is provided with a conductive surface coating layer formed on or overlying an outer surface of the elastic metal plate body at the contacting portion 35*g*. The conductive surface coating layer has hard conductive particles (hereinafter referred to as hard particles) 41 dispersed and embedded in the conductive surface coating layer. The conductive surface coating layer must be formed at the contacting portion but can be formed on the entire surface of the contact.

in the embodiment shown in FIG. 1, the conductive surface coating layer comprises a first plated metal layer or first metal plating layer 43 and a second plated metal layer or a second metal plating layer 47 formed on the first plating metal layer 43. The first metal plating layer 43 has the hard particles 41 dispersed in therein, so that an outer surface of the second plating layer 47 has irregularity due to Inclusion of the hard particles 41 in the surface coating layer. Accordingly, the contact 35 has an irregular surface 36 at the contacting portion 35*g*.

One selected form a group of Ni, Cu, and Sn is used for the metal of the first metal plating layer 43. One selected from a group of Au, Au-alloy, Pd, Pd—Ni alloy, Sn and Sn—Pb alloy is used for the metal of the second metal plating layer 47. The hard conductive particles are TiN, WC, Ni, $TiO_2$ or $Cr_2O_3$ particles or mixed particles of those particles.

The first metal plating layer 43 can be provided with a metal plating sub-layer 45 formed thereon. The metal plating sub-layer 45 is made of the same metal, that is the first metal, as the first metal plating layer 43 except that the hard particles 41 are not included and is not actually distinguished from the first metal plating layer 43. Therefore, the first plating metal layer is represented by reference numerals 43 and 45. On the metal plating sub-layer 45, the second metal plating layer 47 is formed as a finish plating layer.

The first metal plating layer 43 including the hard particles 87 is essential and therefore, either one of the metal plating sub-layer and the second plating layers 45 and 47 can be omitted.

Description will proceed to a method for producing the contact.

Referring to FIG. 2, a metal blank or a carrier-contact assembly 51 is prepared by blanking or stamping a sheet of elastic metal plate, for example, a phosphor bronze plate. The carrier-contact assembly 51 comprises a holding frame or a carrier 50 and a plurality of contact blanks for contacts supported by carrier 50. In FIG. 2, the contact blanks are represented by the same reference numeral as the contact 35. The carrier 50 comprises a carrier bar portion 50*a* and a plurality of strips 50*b* extending from the carrier bar 50*a* to their extending or free ends in parallel with each other. The contact blanks 35 are formed at the free end portions of the strips 50*b*. Each of the contact blanks 35 is shown to have a generally "C" shape formed by bending process. It is noted here that the shape of the contact blank 35 is not restricted to that shown in the figures but is determined as desired.

The blank 51 is then subjected to the electroplating process.

During the blanking process, the blank 51 including the contact blanks 35 is contaminated by a press oil film and other contaminants adhered thereto. Therefore, prior to the electroplating process, the blank 51, especially, the contact blanks 35 are subjected to preliminary treatment to remove the press oil film and other contaminants.

Referring to FIG. 3, an electroplating bath 53 is prepared and contains a composite plating solution 61 which comprises an electroplating solution of a metal acid and hard particles 51 suspended in the electroplating solution. The electroplating bath 53 is provided with an anode electrode 59 which is connected to a positive terminal 57 of a DC power source (not shown). A negative terminal 56 of the DC power source is connected to the carrier 50 of the blank 61 which is partially inserted in the composite plating solution 61 in the bath 53. The bath 53 is further provided with an agitator 64 for stirring the composite plating solution 61.

The blank 51 is set to the electroplating bath 53 by holding the carrier 50 by any suitable holder (not shown) above the bath 53 so that each of the contact blanks 36 is dipped in the composite plating solution 61 partially or entirely depending on a portion to be plated. The carrier 50 is connected to the negative terminal of the DC power source. The DC power source is turned on to start the electroplating process.

Through the plating process, the metal is plated on a surface of each of the contact blanks 35 dipped in the composite plating solution 61 to form a plated metal layer (43 in FIG.1), while the hard particles 41 are simultaneously deposited or precipitated on the surface of each of the contact blanks 35 due to the electro-deposition. Thus, the hard particles 41 are dispersed and embedded in the plated metal layer 43, as seen in FIG. 1. An outer surface of the plated metal layer 43 is therefore have irregularity due to existence of the hard particles 41 therein.

During the composite plating process, agitator 64 is controllably turned on and off in dependence upon the kind of the hard particles 41 and the degree of deposition of the hard particles on the contact blanks 35.

The electroplating solution is an acid solution of metal selected form a group of Ni, Cu, and Sn. The hard particles 37 is selected from TiN (titanium nitride), WC (tungsten carbide), Ni, $TiO_2$ (titanium dioxide), and $Cr_2O_3$ (chromium oxide) but are not restricted to those conductive particles.

The electroplating process for producing the metal plating layer 43 having hard particles embedded therein will be referred to as "composite plating process" and the metal plating layer 43 will be referred to as "first metal plating layer" or as "composite plating layer", hereinafter.

After the forming the first metal plating layer 43, the second and/or third metal plating layer 45 and/or 47, which has been described hereinbefore in connection with FIG. 1, can be formed on the composite plating layer 43 by use of another electroplating bath similar to the bath 53 in FIG. 3 except of an electroplating solution containing no hard particles.

Hereinafter, the plating processes of forming the first through the third metal plating layers 43, 45, and 47 will be described in detail in conjunction with Ni plating for the first and second metal plating layers 43 and 45.

The Ni plating solution comprises 110–140 g/l of nickel sulfamate, 30–45 g/l of boric acid, and additives such as a brightening agent.

The composite plating process is carried out under the conditions including a plating solution temperature of 60° C., a cathode current density (Dk) of 2.5 A/dm$^2$, and a plating time of 30 seconds.

As the hard particles 41, use is made of TiN particles (average particle size of 7.5 μm) which are insoluble particles suspended in the plating solution. The plating bath 53 is filled with the composite plating solution 61 including 100 g/l of the hard particles 37.

in the above-mentioned manner, the composite plating process is performed so that Ni plating layer as the first metal plating layer 43 is formed on the surface of the contact blank 35 and on the hard particles 41 precipitated and electrodeposited on the surface of the contact blank 35. The Ni plating layer 43 has a thickness of about 3–5 micrometers (μm). The TiN particles 41 are embedded in the Ni plating layer 43 so that the Ni plating layer 43 has the irregular surface 36.

In order to more firmly attach the hard particles 37 electrodeposited on the surface of the contact blank 35, the second plating layer 45 is formed by a second plating process. The second plating process is carried out in the following manner.

By the use of an Ni plating solution containing no hard particles, the second plating process is performed under the conditions including a cathode current density (Dk) of 7.5 A/dm$^2$ and a plating time of 30 seconds. Through the second plating process, a plated Ni layer as the second metal plating layer 45 is formed on the first Ni plating layer including the hard particles 41 as the first metal plating layer 43 so that the hard particles 41 electrodeposited on the surface of the contact blank 35 are firmly secured by the second metal plating layer 45. The plated Ni layer 45 has about 3 micrometers (μm).

Subsequently, a third plating process is carried out to form a finish plating layer in order to improve the conductivity and the anticorrosion characteristic of the contact 35. In the third plating process, use is made of a plating solution of acid of metal selected from Au, Au alloy, Sn, Pd, Pd—Ni, Sn—Pb, and so on. Herein, description will be made about electrolytic Sn plating by way of example.

As a plating solution, use is made of an Sn plating solution comprising 30 g/l of stannous sulfate and 130 g/l of concentrated sulfuric acid with a brightening agent added thereto. The third plating process is carried out under the conditions including a cathode current density (Dk) of 2 A/dm$^2$ and a plating time of 2 minutes.

Through the third plating process, an Sn plating layer as the third metal plating layer 47 is formed on the second metal plating layer 45 on the contact blank 35. The third metal plating layer 47 has a thickness of about 3–5 micrometers (μm) and serves to improve the conductivity and the anticorrosion characteristic of the contact 35.

In connection with producing of the conductive surface layer 43, 45 and/or 47, electroplating process has been described. Alternatively, electroless plating process or chemical plating process can be used for production of the conductive surface coating layer. When the forming of first plated layer 42 is performed by the electroless plating process, hard particles 41 are deposited on the surface of the contact blank 35 by precipitation and absorption.

After subjected to these plating processes, the contact blanks 35 are separated or cut from the carrier 60 to provides a plurality of contacts 35. Before or after separating, the contact blanks 35 can be deformed into a desired shape, if it is necessary to do so. The contact blanks 35 can be press-fitted into receptacle holes of any electric device using the contacts 35 before being separated form the carrier 50.

Figure 4:
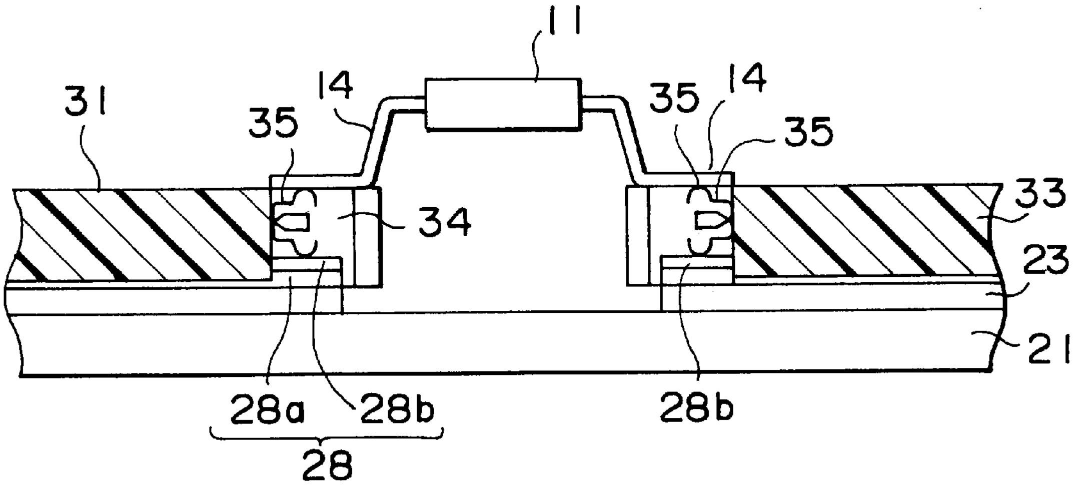
FIG. 4 is a sectional view showing a connector having contacts according to this invention together with an electronic component and a printed circuit board connected by the connector.
Figure 5:
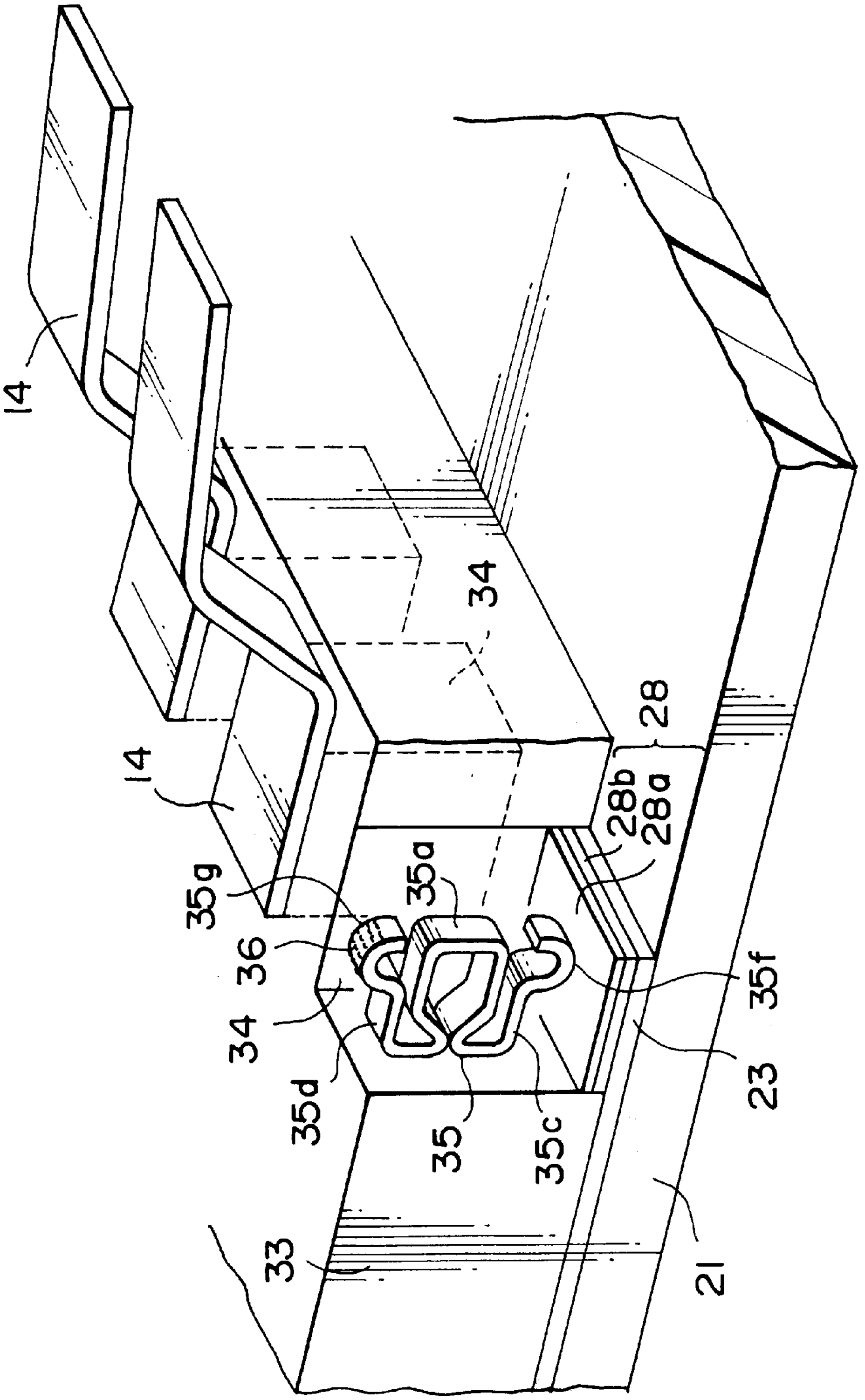
FIG. 5 is a perspective view of a characteristic part in FIG. 4.

Referring to FIGS. 4 and 5, an electrical connector 31 using contacts 35 according to this invention will be demonstrated for electrically and mechanically connecting two connection objects or electric devices to be electrically connected to each other. One of the connection objects is shown as an IC package (hereinafter called an electronic component) 11 of a QFP (quad Flat Package) type and the other connection object is a printed circuit board 21. The electronic component 11 and the printed circuit board 21 are connected via the connector 31.

As illustrated in FIG. 4, the electronic component 11 has a plurality of conductive portions 14 or terminal members such as flat reeds extending from ICs to the outside. The printed circuit board 21 is provided with a conductive wiring pattern 23 and a plurality of conductive portions 28 formed on the conductive wiring pattern 23. The conductive wiring pattern 23 and the conductive portions 28 comprise metal thin films as is known in the art.

The conductive wiring pattern 23 on the printed circuit board 21 can be formed by plating or printing a conductive material such as Cu (copper), Ni (nickel), Sn (tin), Au (gold), Au alloy, Pd (palladium), PdNi, and SnPb.

Each of the conductive portions 28 comprises a lower layer 28*a* formed on the conductive wiring pattern 23 and an upper layer 28*b* formed on the upper layer 28*a*. The upper layer 28*a* is made of Ni while the lower layer 28*b* is made of a material selected from Sn, Au, and SnPb. The upper and the lower layer 28*a* and 28*b* are formed by plating or printing.

The connector 31 comprises a plate-like insulator 33 arranged on the printed circuit board 21 and a plurality of conductive contacts 35 described in connection with FIGS. 1–3. Although FIGS. 2 and 3 show that the contact 35 has a generally "C" shape, the contact 35 in FIGS. 4 and 5 has a different shape, that is a modified "M" shape. The "M" shape of the contact 35 can be formed by performing a bending process before and/or after the electroplating process.

The Insulator 33 is provided with a plurality of receptacle holes 34 to receive the contacts 35, respectively. The receptacle holes 34 are arranged in two arrays and spaced from one another with a predetermined interval. Each contact 35 is inserted or press-fitted into each receptacle hole 34. The conductive wiring pattern 23 has terminals led into receptacle holes 34, respectively. On the terminals of the conductive wiring pattern 23 within the receptacle holes 34, the conductive portions 28 are arranged to face the contacts 35 received in the receptacle holes 34.

Each contact 35 has a holding portion 35*a* of a clip-like shape comprising a pair of long sides faced to each other and a connecting part connecting the long sides to each other, a first contacting spring portion 35*c* connected to one end of the holding portion 35*a* and bent back therefrom to extend in parallel to the one long side of the holding portion 35*a*, and a second contacting spring portion 35d connected to the other end of the holding portion 35*a* and bent back therefrom to extend in parallel to the other long side of the holding portion 35*a*.

The first and the second contacting spring portion 35*c* and 35*d* have contacting portions 35*f* and 35*g* formed at free ends thereof and curved to protrude outward, respectively.

The contact 35 is elastically deformed when contacting pressure is applied to the contact 35 by the conductive portion 28 of the printed circuit board 21 and the conductive portion 14 of the electronic component 11 to compress the contact 35 in the vertical direction.

Thus, the contact 35 is adapted to be elastically deformed from a natural state into a deformed state in which the contacting portions 35*f* and 35*g* approach each other. With this structure, the contacting portions 35*f* and 35*g* are elastically brought into contact with the conductive portions 28*b* and 14*b*, respectively.

The contact 35 has an irregular surface 36 formed at least on an outer surface of each of the contacting portions 35*f* and 35*g*. The irregular surface 36 is formed by the composite plating process which has been described in connection with FIGS. 1–3.

When the conductive portion 14 of the electronic component 11 is pressed against the contact 35 and towards the printed circuit board 21, oxide and other contaminants adhered to the conductive portion 28 of the printed circuit board 21 and to the conductive portion 14 of the electronic component 11 are torn up by hard protrusions on the irregular surface 36 of the contact 35. Further, contacting portions 35*f* and 35*g* slightly move by deformation of the contact to wipe surfaces of the conductive portions 28 and 14, respectively. Thus, the oxide and other contamination are removed. Thereafter, the electronic component 11 and the printed circuit board 21 are held in a condition fixed to the connector 31 by a holding member (not shown).

in the above-mentioned manner, reliable electric connection is established between the conductive portion 14 of the electronic component 11 and the contact 35 and between the contact 35 and the conductive portion 28 of the printed circuit board 21 even if the contacting pressure is low.

Figure 6:
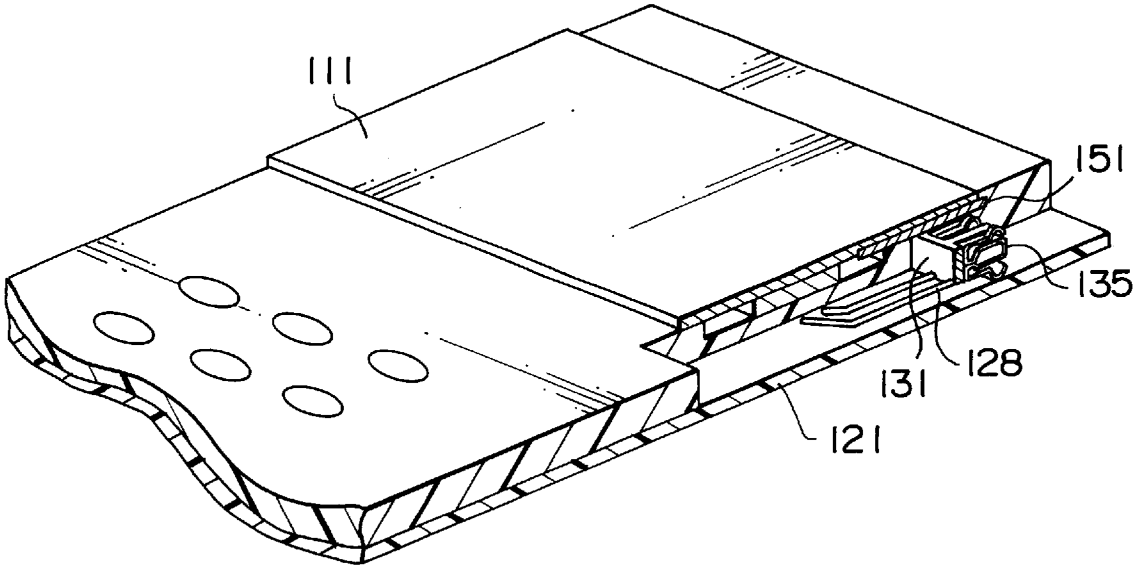
FIG. 6 is a perspective view shoving a connector having contacts according to this invention together with an electronic component and a printed circuit board connected by the connector.

Referring to FIG. 6, two connection objects are connected by a connector 131 having contacts 135 similar to contacts 35 in FIGS. 4 and 5. One of the connection objects is an LCD panel (hereinafter referred to as an electronic component) 111 assembled into a mobile telephone set (not shown) and the other connection object is a printed circuit board 121 mounted in the mobile telephone set.

Figure 7:
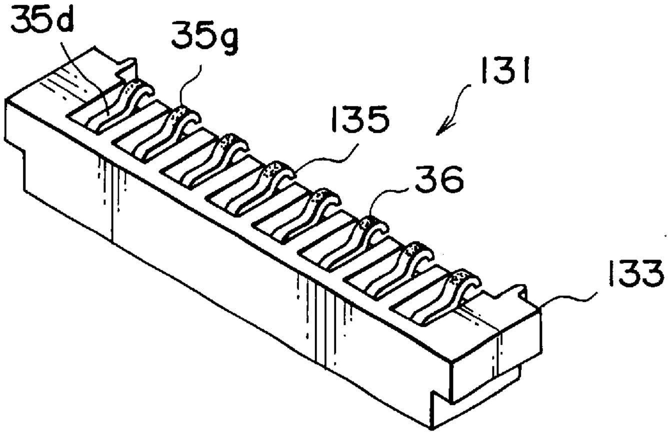
FIG. 7 is a perspective view of the connector Illustrated in FIG. 6.

Referring to FIG. 7, the connector 131 comprises an insulator 133 with a plurality of contacts 135 fitted therein. The contacts 135 are subjected to plating processes in the manner similar to those described in conjunction with FIGS. 1–3.

The outer surface of the contacting portion 35*f* (see FIG. 5) is brought into contact with conductive portion 128 of me printed circuit board 121. On the other hand, the outer surface of the contacting portion 35*g* (see FIG. 5) is brought into contact with an Indium tin oxide (ITO) film 151.

The connector 131 is placed on the printed circuit board 121. Between the connector 131 and the electronic component 111, the ITO film 151 as a transparent conductive electrode is interposed.

The contact 135 is brought into contact with the conductive portion 128 of the printed circuit board 121 and the ITO film 151 with low contacting pressure to electrically connect the conductive portion 128 and the ITO film 151. The contact 135 has the irregular surface 36 like the contact 35. Therefore, even if the contacting pressure is low, reliable electric connection between the ITO film 151 and the conductive portion 128 is assured.

Figure 8:
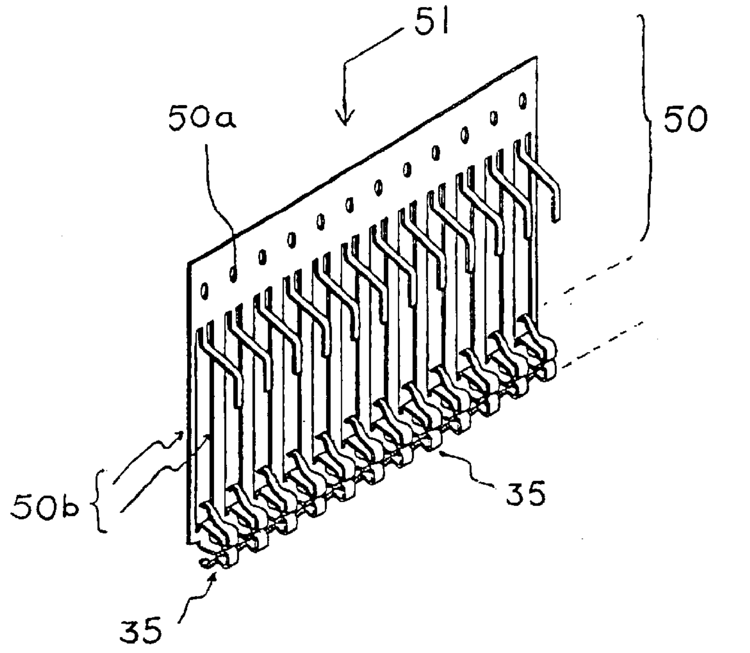
FIG. 8 is a perspective view of a metal blank for producing contacts used in connectors shown in FIGS. 4–7, similar to FIG. 2.

A metal blank for producing contacts having the modified "M" shape (35 in FIGS. 4 and 5, and 135 in FIGS. 6 and 7) is shown at 51 in FIG. 8. The similar parts are represented by the same reference numerals. The metal blank 51 shown in the figure is similar to that shown in FIG. 2 except that the blank 51 has a plurality of contact blanks 35 having not "C" shape but the modified "M" shape and minor changes accompanied with the shape of the contact blanks 35.

Figure 9:
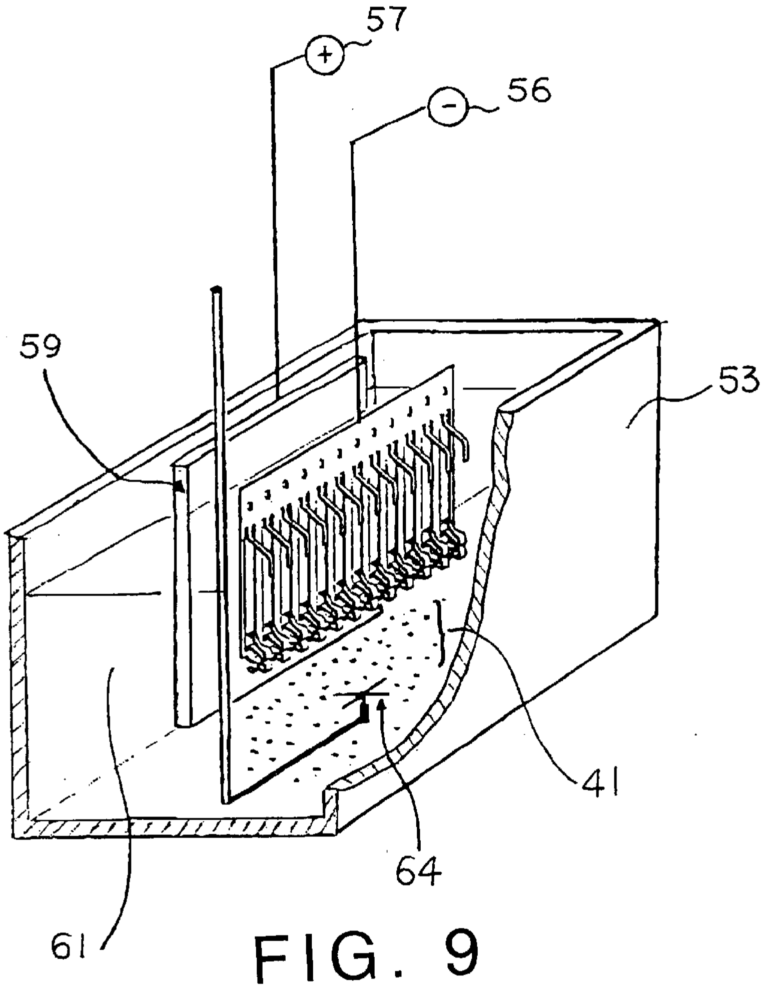
FIG. 9 is a perspective view of an electroplating bath with the blank of FIG. 8 being subjected to an electroplating process, similar to FIG. 3.

An electroplating bath for use in electroplating of the metal blank 51 of FIG. 8 is shown in FIG. 9. The bath is similar to that in FIG. 3. The similar parts are represented by the same reference numerals and the description thereto are omitted.

As described in conjunction with the foregoing embodiments, the irregular surface of the first metal plating layer including the hard particles serves to crush and tear up the oxide and other contaminants even with the low contacting pressure. It is therefore possible according to this invention to assure the reliable electric connection between the contacts and the conductive portions.

in the contact mentioned above, the oil film and the contaminants can be destructed also by a wiping function of the microscopic irregular surface.

Since the contact can be connected with the low contacting pressure, high-density arrangement in the insulator is possible. Therefore, the connector using the contact of this invention is adaptable to signal transmission/reception at a high speed.

According to this invention, the irregular surface can readily be formed on the surface of the contact by carrying out the composite plating process using the composite plating solution including the hard particles.

If the second metal plating layer is formed after the composite plating process, the adhesive strength of the hard particles electrodeposited on the first metal plating layer is increased to firmly secure the hard particles onto the surface of the contact.

If the third metal plating layer as a finish plating layer is formed, the conductivity and the anticorrosion characteristic of the contact are improved.

According to this invention, even if the number of contacts fitted into the connector is equal to 500 or more, reliable contact and sufficient electrical connection are established between the contacts and the conductive portions without requiring high contacting pressure.

This invention is not only applicable to the connectors of the type such that the contact is abutted to the terminal member or conductive portion but also to those connectors of the type in which the contact and the conductive portion are brought into sliding contact.

What is claimed is:

1. A method for producing an electrical contact wherein said surface coating layer is a plated metal layer having hard coated particles said method comprising the steps of:

preparing a metal blank by blanking a sheet of elastic metal plate, said metal blank comprising a carrier frame and a plurality of contact blanks extending from the carrier frame to their extending free ends in parallel with each other;

preparing an electroplating bath containing a composite plating solution comprising an electroplating solution of a first metallic acid and hard conductive particles suspended therein;

subjecting said blank to an electroplating process by use of said electroplating bath by holding the carrier above the composite plating solution so that the contact blanks are at least partially dipped in the composite plating solution, to thereby form a first plated layer of the first metal on a surface of a portion of each of the contact blanks dipped in the composite plating solution and, simultaneously, deposit said the hard conductive particles on said surface due to electro-deposition so that the hard conductive particles are dispersed in the first plated layer, said first plated layer has an outer surface with irregularity due to presence of the hard conductive particles dispersed therein; and separating each of said contact blanks from said carrier frame, after taking out and drying said blank from said electroplating bath, to provide said contact.

2. The method as claimed in claim 1, which further comprises forming each of said contact blanks in a desired shape by bending and/or curving process, before and/or after said cutting.

3. The method as claimed in claim 1, which further comprises subjecting said blank, before cutting each of contact blanks from the carrier frame, to second and/or third plating process to form second and/or third plated layer on the first plated layer.

4. The method as claimed in claim 3, wherein said second plated layer is of the first metal and is directly formed on the first plated layer by use of a second electroplating bath containing the electroplating solution of the first metal acid without the hard conductive particles.

5. The method as claimed in claim 3, wherein said third plated layer is of a second metal different from the first metal and is directly formed on the first plated layer by use of a third electroplating bath containing the electroplating solution of the third metal acid without the hard conductive particles.

6. The method as claimed in claim 3, wherein said second plated layer is of the first metal and is directly formed on the first plated layer by use of a second electroplating bath containing the electroplating solution of the first metal acid without the hard conductive particles, and wherein said third plated layer is of a second metal different from the first metal and is directly formed on the second plated layer by use of a third electroplating bath containing the electroplating solution of the third metal acid without the hard conductive particles.

7. The method of claim 1 and further steps comprising forming a conductive surface coating layer formed on a body surface of at least the contacting portion of said contact blanks, said conductive surface coating layer having a predetermined thickness, and said hard conductive particles have an average particle size approximately the predetermined thickness.

8. The method of claim 1 and the further step of forming said elastic metal plate from a metal selected from a group consisting of phosphor bronze and other Cu-base alloys.

9. The method of claim 1 and the further step of selecting said hard conductive particles from a group consisting of TiN, WC, Ni, $TiO_2$ and $Cr_2O_3$.

10. The method of claim 1 and the further steps of forming a metal layer comprising said first plated layer containing said conductive hard particles dispersed therein formed on a body surface, and forming a second plated layer on the first plated layer.

11. The method as claimed in claim 10 comprising forming said first plated layer by a primary plated sub-layer made of a first metal and containing the conductive hard particles dispersed therein, and forming a secondary plated sub-layer made of the first metal and formed on the primary plated sub-layer, and forming said second plated layer of a second metal which is different from the first metal and is formed on the secondary plated sub-layer.

12. The method as claimed in claim 10, wherein said first metal is selected form a group consisting of Ni, Cu, and Sn.

13. The method as claimed in claim 11, wherein said second metal is one selected from a group consisting of Au, Au-alloy, Pd, Pd—Ni alloy, Sn and Sn—Pb alloy.

* * * * *

UNITED STATES PATENT AND TRADEMARK OFFICE
CERTIFICATE OF CORRECTION

PATENT NO. : 6,360,437 B1
DATED : March 26, 2002
INVENTOR(S) : Fukumoto et al.

It is certified that error appears in the above-identified patent and that said Letters Patent is hereby corrected as shown below:

Title page, Item [54] and Column 1, lines 1-5,
Delete "ELECTRICAL CONTACT HAVING SURFACE COATING LAYER WITH IRREGULAR SURFACE DUE TO HARD PARTICLES DISPERSED IN THE SURFACE COATING LAYER" and insert -- METHOD OF MAKING ELECTRICAL CONTACT HAVING SURFACE COATING LAYER WITH IRREGULAR SURFACE --

Drawings,
FIG. 5, 28a and 28b should be reversed.

Column 1,
Lines 16, 32 and 48, delete "in" and insert -- In --

Column 2,
Line 14, delete "conducive" and insert -- conductive --
Line 44, delete "form" and insert -- from --

Column 3,
Line 50, delete "shoving" and insert -- showing --
Line 54, delete "Illustrated" and insert -- illustrated --

Column 4,
Line 14, delete "in" and insert -- In --
Line 20, delete "Inclusion" and insert -- inclusion --
Line 24, delete "form" and insert -- from --
Line 42, delete "87" and insert -- 41 --

Column 5,
Line 6, delete "51" and insert -- 41 --
Line 16, delete "36" and insert -- 35 --
Line 39, delete "37" and insert -- 41 --
Line 64, delete "C." and insert -- C --

Column 6,
Lines 3 and 13, delete "37" and insert -- 41 --
Line 4, delete "in" and insert -- In --
Line 54, delete "42" and insert -- 43 --
Line 58, delete "60" and insert -- 50 --
Line 63, delete "form" and insert -- from --

UNITED STATES PATENT AND TRADEMARK OFFICE

CERTIFICATE OF CORRECTION

PATENT NO. : 6,360,437 B1 
DATED : March 26, 2002
INVENTOR(S) : Fukumoto et al.

It is certified that error appears in the above-identified patent and that said Letters Patent is hereby corrected as shown below:

<u>Column 7,</u>
Line 21, delete "upper layer 28*a*" and insert -- lower layer 28*a* --
Line 22, delete "lower layer 28*b*" and insert -- upper layer 28*b* --
Line 23, delete "upper" and insert -- lower --
Line 24, delete "lower" and insert -- upper --
Line 35, delete "Insulator" and insert -- insulator --

<u>Column 8,</u>
Line 2, delete "14*b*" and insert -- 14 --
Line 20, delete "in" and insert -- In --
Line 38, delete "me" and insert -- the --
Line 41, delete "Indium" and insert -- indium --

<u>Column 9,</u>
Line 8, delete "in" and insert -- In --

<u>Column 10,</u>
Line 61, delete "form" and insert -- from --

Signed and Sealed this

Fifth Day of August, 2003

JAMES E. ROGAN
*Director of the United States Patent and Trademark Office*